United States Patent [19]
Goto

[11] Patent Number: 4,984,271
[45] Date of Patent: Jan. 8, 1991

[54] CIPHER SYSTEM WITH CLOSED CIPHER PROCEDURE
[75] Inventor: Kenjiro Goto, Atsugi, Japan
[73] Assignee: Hitachi, Ltd., Tokyo, Japan
[21] Appl. No.: 188,339
[22] Filed: May 4, 1988
[30] Foreign Application Priority Data May 11, 1987 [JP] Japan ................ 62-112566

[51] Int. Cl.⁵ .............................. H04L 9/00
[52] U.S. Cl. ........................ 380/25; 380/4; 380/28
[58] Field of Search ................ 380/25, 28, 4
[56] References Cited

U.S. PATENT DOCUMENTS

| 4,465,901 | 8/1984 | Best .................. 380/4 |
| 4,484,025 | 11/1984 | Ostermann et al. ...... 380/28 |
| 4,486,828 | 12/1984 | Kitamura et al. ....... 380/25 |
| 4,691,355 | 9/1987 | Wirstrom et al. ....... 380/25 |
| 4,694,492 | 9/1987 | Wirstrom et al. ....... 380/25 |
| 4,727,368 | 2/1988 | Larson et al. ......... 235/382 |
| 4,797,928 | 1/1989 | Pykes ................. 380/25 |
| 4,811,288 | 3/1989 | Kleijne et al. ........ 380/4 |

FOREIGN PATENT DOCUMENTS 5960844 3/1986 Japan.
60-189 12/1986 Japan.
60102945 4/1987 Japan.

OTHER PUBLICATIONS

Security Measures for Protecting Information Against Tapping and Falsification, by Danial Fidlow.
Nikkei Communications, Jun. 22, 1985, pp. 58–66.

Primary Examiner—Salvatore Cangialosi
Attorney, Agent, or Firm—Pennie & Edmonds

[57] ABSTRACT

A cipher system in a computer network having a host computer and terminal equipments connected by communication lines. A terminal equipment cipher process program memory area is provided in a volatile memory area of a storage of a terminal equipment which upon turning-on of its power, requests a transfer of the terminal cipher process program from the host computer to the terminal equipment. In response to the request, the host computer sends the terminal cipher process program previously developed at the host computer side to the terminal equipment to thereby make the program to be stored in the memory area of the terminal equipment. Enciphering and deciphering during communication between the host computer and the terminal equipment are performed by using the host computer and terminal equipment cipher process programs stored in the respective host computer and the terminal equipment.

10 Claims, 2 Drawing Sheets

CIPHER SYSTEM WITH CLOSED CIPHER PROCEDURE

BACKGROUND OF THE INVENTION

The present invention relates to a cipher system used for communication between a host computer and terminal equipments, and more particularly, to a cipher system with a closed cipher procedure which makes it possible to realize a system architecture without opening the cipher procedure algorithm to supervisors at the terminal equipments.

Conventional techniques regarding cipher systems of computer networks or the like, are known disclosed, for example, in a cipher algorithm "DES" enacted by Department of Commerce of US Government in 1977 or in a publication "Nikkei Communications", June 22, 1985, pp. 58 to 66. According to such conventional techniques, an identical cipher process program is provided to both a host computer and a terminal equipment to encipher data at a sending party and decipher the data at a receiving party to obtain a plain text. In such a cipher process system, both the host computer and the terminal equipment carry out the same cipher process. Therefore, in developing a terminal equipment or in other cases, the cipher procedure algorithm developed at the host computer is made open to the manufacturer or supervisor of the terminal equipment to prepare a cipher process program at the terminal equipment.

If the manufacturer or supervisor is the same for both the host computer and the terminal equipment, the above-described conventional technique poses no problem since the cipher procedure algorithm is not made open to the third party. Due to recent progress in networking, it has become possible to communicate between equipments of different makers, between equipments under different supervisors, and between equipments of different business fields, within a single network constructed of a plurality of host computers and terminal equipments. If a conventional cipher system technique is applied to such a system, the cipher procedure algorithm must be made open to associated parties under communication, thus posing a problem of a difficulty to keep secret the cipher procedure algorithm. Although various systems to solve such a problem and avoid unauthorized utilization of a computer network have been studied, a perfect solution has been not given to date.

SUMMARY OF THE INVENTION

It is an object of the present invention to solve the above technical problems and provide a cipher system with closed cipher procedure wherein it is not necessary for the cipher procedure algorithm to be made open to a manufacturer or supervisor of another equipment.

According to the cipher system of this invention, a host cipher process program and a terminal cipher process program both developed at a host computer side are stored in a storage of the host computer at a specific memory area, the terminal cipher process program being executable at the terminal equipment to perform a cipher process using the same algorithm as that of the host cipher process. Also stored in the storage is a down-load program which is used for transferring the terminal cipher process program from the host computer to the terminal equipment. A terminal equipment generally uses a one-chip microcomputer available in the market, so that a terminal chipher process program can be made at the host computer based on the specification of the one-chip microcomputer. If the microcomputer of the terminal equipment is changed to a new one and the new instructions thereof are informed to the host computer side, then programming a new terminal cipher process program is also possible. The terminal equipment is provided with a volatile storage in which the terminal cipher process program is stored at a specific memory area. The terminal equipment is also provided with a non-volatile storage in which a down-load reception program serving to request the terminal cipher process program from the host computer and receive it, is stored at a specific memory area. Upon turning on the power, the terminal equipment runs the down-load reception program and sends a down-load request to the host computer which in response to the request, runs its down-load program to send the terminal cipher process program to the terminal equipment. The terminal equipment causes the terminal cipher process program to be stored in the specific memory area of the volatile storage, under control of the down-load reception program.

The host cipher process program memory area at the host computer is a memory area for storing a program which during data transmission to and from a terminal equipment, runs to encipher the data to be transmitted or decipher the received data into a plain text. The terminal cipher process program memory area at the host computer is a memory area for storing a program for cipher-processing transmission/reception data at the terminal equipment, which program is down-loaded from the host computer to the terminal equipment. The down-load program memory area at the host computer is a memory area for storing a program which runs to transfer the terminal cipher process program from the host computer to the terminal equipment.

The down-load reception program memory area at the terminal equipment is a memory area for storing a program which runs to receive the terminal cipher process program transferred from the host computer and store it in the specific memory area. The terminal cipher process program at the terminal equipment is a memory area for storing a program which is transferred from the host computer and runs to encipher data to be transmitted to the host and decipher received data into a plain text, the contents of the memory area being erased upon turning off the power.

According to the present invention, the terminal cipher process program is transferred from the host computer to the terminal equipment via a communication line after the power has been turned on at the terminal equipment. The terminal equipment can use the transferred terminal cipher process program as it is for converting an enciphered text into a plain text or vice versa, without giving any modification to the program, thus enabling a cipher system architecture which need not make open the cipher procedure algorithm. It is not necessary for the terminal equipment to know the cipher procedure algorithm or develop a cipher process program. Providing only a memory space at the terminal equipment can suffice to realize a cipher memory system which can keep secret the cipher procedure algorithm.

Moreover, the terminal equipment side cannot know a change in the terminal chipher process program made by the host computer side. Therefore, by changing the program now and then, a cipher system with higher secrecy can be made.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENT

Figure 1:
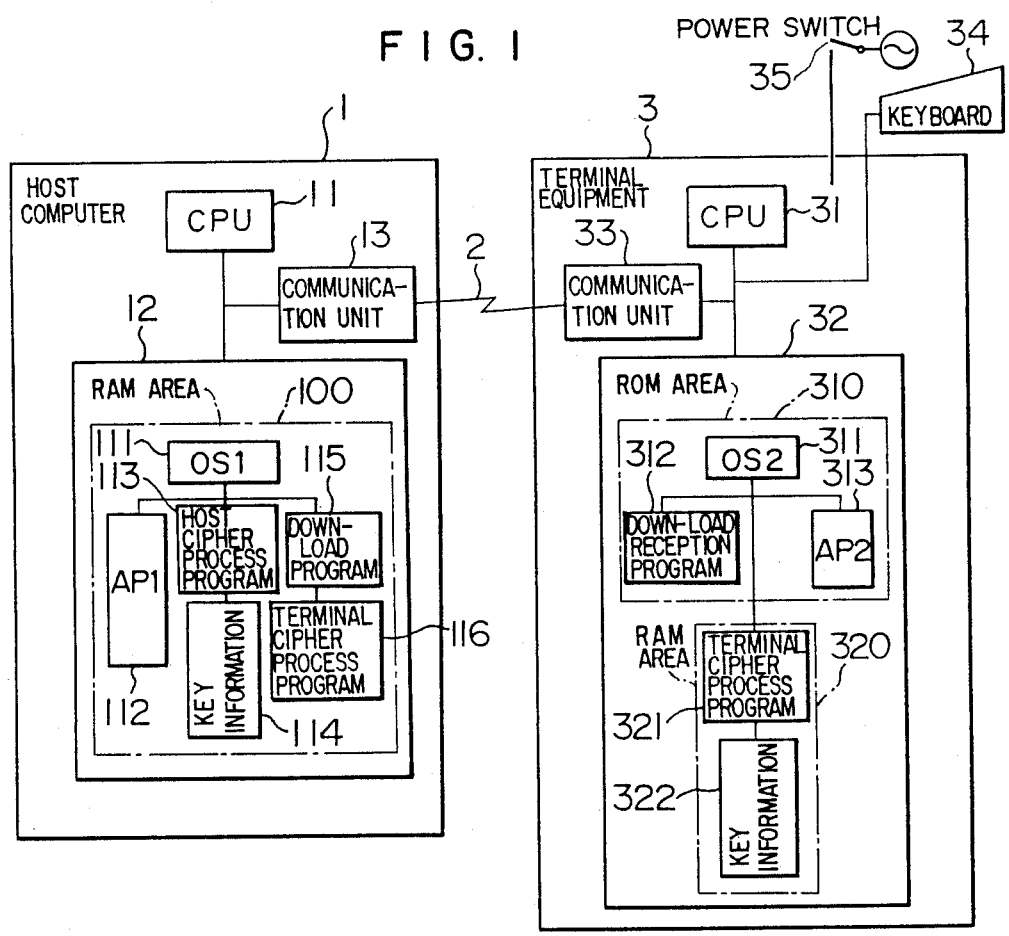
FIG. 1 is a block diagram showing the structure of an embodiment of a cipher system according to the present invention.
Figure 2:
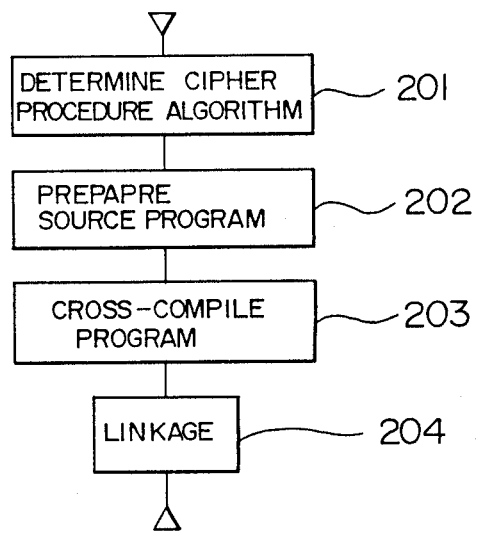
FIG. 2 is a flow chart illustrating the development procedure of a cipher process program used by a terminal equipment.
Figure 3:
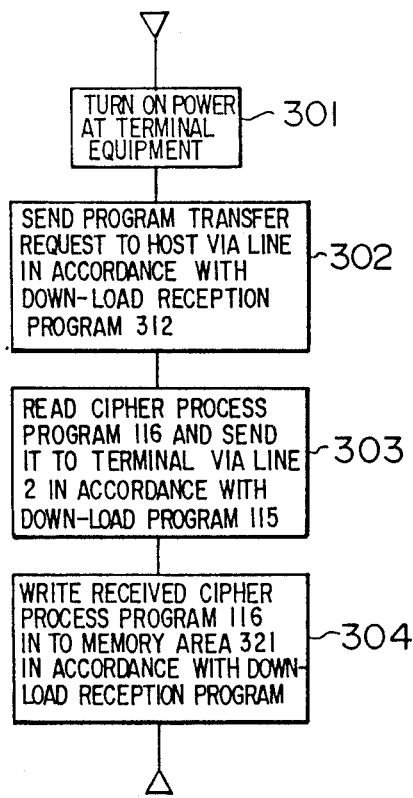
FIG. 3 is a flow chart illustrating the download procedure of a cipher process program from a host computer to a terminal equipment.
Figure 4:
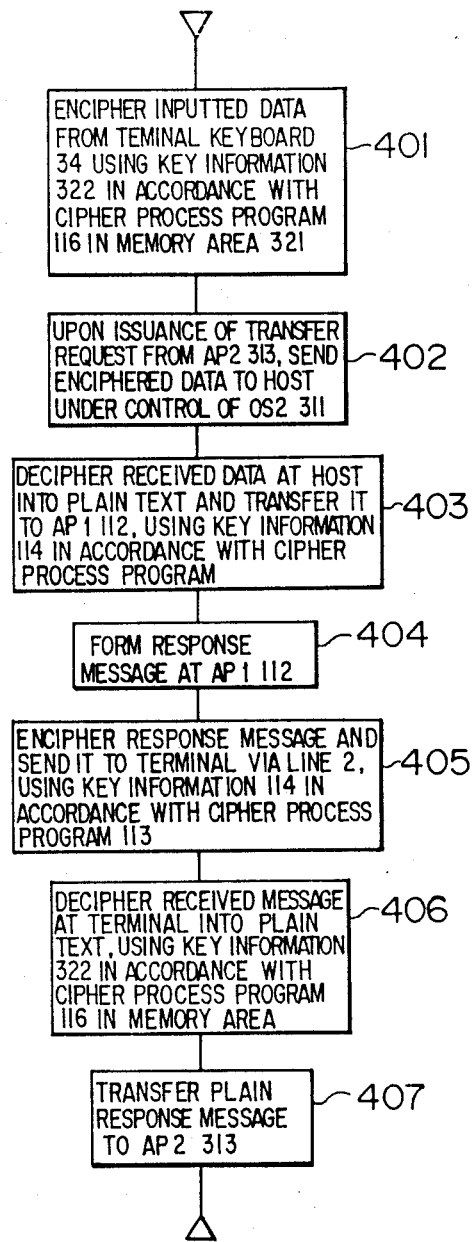
FIG. 4 is a flow chart illustrating enciphering and deciphering procedure during data communication between a host computer and a terminal equipment.

FIG. 1 is a block diagram showing the structure of an embodiment of a cipher system according to the present invention; FIG. 2 is a flow chart illustrating the development procedure of a chipher process program used by a terminal equipment; FIG. 3 is a flow chart illustrating the down-load procedure of a chipher process program from a host computer to a terminal equipment; and FIG. 4 is a flow chart illustrating enciphering and deciphering procedure during data communication between a host computer and a terminal equipment. Referring to FIG. 1, reference numeral 1 denotes a host computer, 2 a communication line, and 3 a terminal equipment. The host computer 1 has a CPU 11, a storage 12 and a communication unit 13. The terminal equipment 3 has a CPU 31, a storage 32 and a communication unit 33, and is provided with a keyboard 34 connected thereto and a power switch 35. A RAM area 100 of the storage of the host computer 1 has an operating system 1 (OS1) area 111, a host cipher process program area 113 and a terminal cipher process program area 116, a key information area 114 and a down-load program area 115. A storage 32 of the terminal equipment 3 includes a ROM area 310 and a RAM area 320. The ROM area 310 has an operating system 2 area 311, a down-load reception program area 312 and an application program 2 (AP2) area 313. The RAM area 320 has a terminal cipher process program area 321 and a key information area 322.

A cipher process of this invention can be carried out without using the key information. However, the embodiment shown in FIG. 1 utilizes the key information in the cipher procedure algorithm. The embodiment system thus utilizes the key information in enciphering and deciphering, and is applied to data communication between the host computer 1 and the terminal equipment 3 via the communication line 2.

Referring again to FIG. 1, the host computer 1 has as program memory areas the RAM area 100 in its storage 12. The RAM area 100 stores an operating system 1 (OS1) 111, a cipher process program 116 for use by the terminal equipment 3, a down-load program 115 for use in transferring the cipher program 116 to the terminal equipment 3, a cipher process program 113 for use by the host computer 1, a key information 114 and an application program 1 (AP1) 112.

The terminal equipment 3 has as program memory areas the non-volatile memory ROM area 310 and the volatile memory RAM area 320 whose contents are erased upon turning-off of the power, respectively in its storage 32. The keyboard 34 connected to the terminal equipment 3 is used for inputting various data. The ROM area 310 of the terminal equipment 3 stores an OS2 311, a down-load reception program 312 for use in receiving the terminal cipher process program 116 from the host computer 1 and in writing it in the memory area 321, and an AP2 313. The RAM area 320 is provided with the cipher process program memory area 321 into which the terminal cipher process program 116 sent from the host computer 1 is written, and stores a key information 322. The key information 322 is set at the host computer 1 and notified to the terminal equipment 3 not via the communication line 2 but via another route. The notified key information is inputted from the keyboard 35 and is discriminated by the CPU 31 to store it in the RAM area 320 of the storage 32.

The cipher process program 116 to be used by the terminal equipment 3 is previously developed at the host computer side and stored in the RAM area 100. The development procedure will be described with reference to the flow chart shown in FIG. 2.

(1) The encipher procedure algorithm for use with data transferred between the host computer 1 and the terminal equipment 3 is determined at the host computer side without notifying it to the terminal equipment side (step 201).

(2) A source program is prepared using a programing language used at the terminal equipment 3, in accordance with the cipher procedure algorithm determined at step 201 (step 202).

(3) The source program is compiled to make it executable at the terminal equipment 3, using a cross compiler which produces a program for a computer different from the host computer 1 (step 203).

(4) After compiling, the produced unit programs are linked to produce a load module (step 204).

(5) The load module is stored in the RAM area 100 in the manner as usual.

Next, the down-load procedure of the cipher process program 116 from the host computer to the terminal equipment 3 will be described with reference to the flow chart shown in FIG. 3.

(1) The power of the terminal equipment 3 is made turned on. Upon turning-on of the power, the download reception program 312 is activated at the terminal equipment by the OS2 stored in the ROM area to start a down-load process in accordance with the program under control of the CPU 31. The contents of the cipher process program area 321 have been erased while the power is off, so that the cipher process program 116 is not held therein (step 301).

(2) The terminal equipment 3 running with the down-load reception program 312 issues a transfer request for the cipher process program 116 to the host computer 1, from the communication unit 33 via the communication line (step 302).

(3) The host computer 1 receives the transfer request from the terminal equipment 3 via the communication unit 13 so that the OS1 activates the down-load program 115. The host computer 1 reads the cipher process program 116 in accordance with the down-load program 115 under control of the CPU 11, which program is sent to the terminal equipment 3 via the communication line 2 (step 303).

(4) When the terminal equipment 3 under control of the down-load reception program 312 receives the cipher process program 116 from the host computer 1, it writes the program 116 in the cipher process program memory area 321 of the RAM area 32 without giving any modification to the received program 116 (step 304).

Data communication between the terminal equipment 3 and the host computer 1 is performed using the developed cipher process program down-loaded to the terminal equipment 3, in accordance with the flow chart shown in FIG. 4, which will be described in the following.

(1) As the keyboard 34 connected to the terminal equipment 3 inputs inquiry data for example, the data are enciphered using the key information 322 in accordance with the cipher process program 116 downloaded from the host computer 1 and stored in the memory area 321 of the terminal equipment 3 (step 401).

(2) Upon issuance of a transfer request from the AP2 313, the OS2 311 controls to send the enciphered inquiry data to the host computer 1 (step 402).

(3) The host computer 1 deciphers the received, enciphered inquiry data into a plain text using the key information 114 in accordance with the host computer cipher process program 113 and transfers the plain text to the AP1 112 (step 403).

(4) The AP1 112 generates a response message to the received inquiry data (step 404).

(5) The response message is enciphered using the key information 114 in accordance with the cipher process program 113 and sent to the terminal equipment 3 via the communication line 2 (step 405).

(6) The terminal equipment 3 deciphers the received response message into a plain text using the key information 322 in accordance with the cipher process program 116 stored in the memory area 321 (step 406).

(7) The plain response message is sent to the AP2 313 (step 407).

As seen from the foregoing description of the present embodiment, the cipher process program developed at the host computer 1 side is compiled and down-loaded to the terminal equipment 3 which can use it for the cipher process of data communication with the host computer 1. Therefore, the manufacturer or supervisor of the terminal equipment 3 is not necessary to know the cipher procedure algorithm, but it is sufficient if only a memory area therefor is provided at the terminal equipment. Consequently, the host computer side need not make the cipher procedure algorithm open to the terminal equipment side. Even it is attempted to read and analyze the cipher process program within the terminal equipment, it is very difficult to decode the algorithm from the program written in machine languages. It is also possible to change the cipher procedure algorithm now and then at the host computer side to prevent such injustice.

The cipher system of this invention can perform a cipher process without using key information. In this case, without storing the key information 114 and 322 at both the host computer 1 and the terminal equipment 3, enciphering and deciphering during data transmission from terminal computer 3 to the host computer 1 or vice versa are carried out using the enciphering and deciphering algorithms implemented in the cipher process programs stored in the memory areas 321 and 113.

According to the embodiment shown in FIG. 1, even if it is intended illegally to steal the cipher process program via the communication line 2, the stolen data cannot be decoded because the key information necessary for the decoding is separately provided in the terminal equipment.

A cipher process for a network constructed of a host computer and a single terminal equipment connected thereto via a communication line has been described in connection with the embodiment shown in FIG. 1 to simplify the description. However, a plurality of terminal equipments may be connected to a host computer via communication lines, and a similar cipher process to that of the embodiment shown in FIG. 1 is possible with or without using key information. In this case, the cipher procedure algorithm can be changed for each terminal equipment.

I claim:

1. A cipher system for performing an enciphering and deciphering procedure of communication between host computers and terminal eqiupments while keeping the procedure secret, comprising:

a host computer having a first volatile storage (RAM AREA 100) for storing programs including a cipher process program (113) to be used at the host computer and a cipher process program (116) to be used at the terminal equipment and preparation means coupled to said first volatile storage and including a processor (11) for preparing (or updating) the cipher process program for terminal equipment for allowing downloading of non-fixed cipher process program; and at least one terminal equipment connected to said host computer via a communication line, said at least one terminal equipment comprising a second volatile storage (RAM AREA 320) for storing program including said terminal equipment cipher process program and request means (ROM AREA 310) for requesting said terminal equipment cipher process program from said host computer in response to turning-on of the power of said at least one terminal equipment;

in which said at least one terminal equipment requests said terminal equipment cipher process program from said host computer immediately upon turning-on of the power of said at least one terminal equipment, said host computer sends said terminal equipment cipher process program prepared in said volatile storage of said host computer to said at least one terminal equipment in response to said request to thereby download said terminal equipment cipher process program to be stored in said volatile storage of said at least one terminal equipment, and enciphering and deciphering during communication between said at least one terminal and said host computer are performed at said at least one terminal equipment and at said host computer using said host computer cipher process program and said terminal equipment cipher process program, respectively.

2. A cipher system according to claim 1, wherein said host computer cipher process program includes ciphering and deciphering key information, and said key information is inputted in said volatile storage of said at least one terminal equipment from an input device connected to said at least one terminal equipment.

3. A cipher system according to claim 1, wherein said processor operates based on a download program stored by first volatile storage to change said terminal equipment cipher process program to be stored in said at least one terminal equipment for each terminal equipment.

4. A method for performing an enciphering and deciphering procedure of communication between host computers having a processing means, a data input/output interface means and a volatile memory means, and terminal equipments having a processing means, a data input/output interface mans, a volatile memory means a nonvolatile memory means, said method comprising the steps of:
- (1) composing a source code formatted host cipher program at said host computer;
- (2) composing a source code formatted terminal cipher program at said host computer;
- (3) compiling said source code formatted host cipher program into a host cipher program and storing said host cipher program in said host volatile memory means;
- (4) compiling in said host computer said source code formatted terminal cipher program into a terminal cipher program which will operate in said terminal equipment without further compiling and storing said terminal cipher program in said host volatile memory;
- (5) outputting a terminal cipher program request signal from said terminal equipment to said host computer in response to power being applied to said terminal equipment;
- (6) outputting said terminal cipher program from said host computer volatile memory means to said terminal equipment, via said host data input/output interface means, in response to said host receiving said request signal, said outputting being controlled by a transfer program stored in said host volatile memory means;
- (7) storing said terminal cipher program in said terminal equipment volatile memory means, said storing being controlled by a storage program stored in said terminal equipment non-volatile memory means;
- (8) inputting data into said terminal equipment from either or both of a data input device connected to said terminal equipment or said terminal equipment data input/output interface means;
- (9) enciphering said inputted data according to said terminal cipher program.

5. A method for performing an enciphering and deciphering form of communication between host computers and terminal equipments according to claim 4 further comprising the steps of:
- (10) outputting said enciphered data from said terminal equipment to said host computer;
- (11) receiving said enciphered terminal output data at said host computer;
- (12) deciphering said received enciphered data according to a cipher program stored in said host computer volatile memory means.

6. A method for performing an enciphering and deciphering form of communication between host computers and terminal equipments according to claim 4 further comprising the steps of:
- (13) receiving enciphered data at said terminal equipment;
- (14) deciphering said received enciphered data according to a terminal cipher program stored in said terminal equipment volatile memory.

7. A method for performing an enciphering and deciphering form of communication between host computers and terminal equipments according to claim 5 further comprising the steps of:
- (15) receiving enciphered data at said terminal equipment;
- (16) deciphering said received enciphered data according to a terminal cipher program stored in said terminal equipment volatile memory.

8. A method for performing an enciphering and deciphering form of communication between host computers and terminal equipments according to any one of claims 4-7 further comprising the step of:
- (17) erasing cipher program data in said terminal equipment volatile memory means in response to switching off the power source to said terminal equipment.

9. A method for performing an enciphering and deciphering form of communication between host computers and terminal equipments according to any one of claim 4-7 wherein a key information is loaded into said terminal equipment via an operator data input device and stored in said terminal equipments volatile memory means after said cipher program has been outputted from said host computer and stored in said terminal device, such that said cipher program stored in said terminal equipment will function only if said key information corresponds with a key information stored in said host computer volatile memory.

10. A method for performing an enciphering and deciphering form of communication between host computers and terminal equipments according to claim 9 further comprising the step of:
- (18) erasing said cipher program and said key information stored in said terminal equipment volatile memory means in response to switching off the power source to said terminal equipment.

* * * * *